Jan. 25, 1927.
W. M. BAXTER
1,615,532
REMOVABLE TRUCK BODY LOCKING MECHANISM
Filed Sept. 5, 1924     2 Sheets-Sheet 1
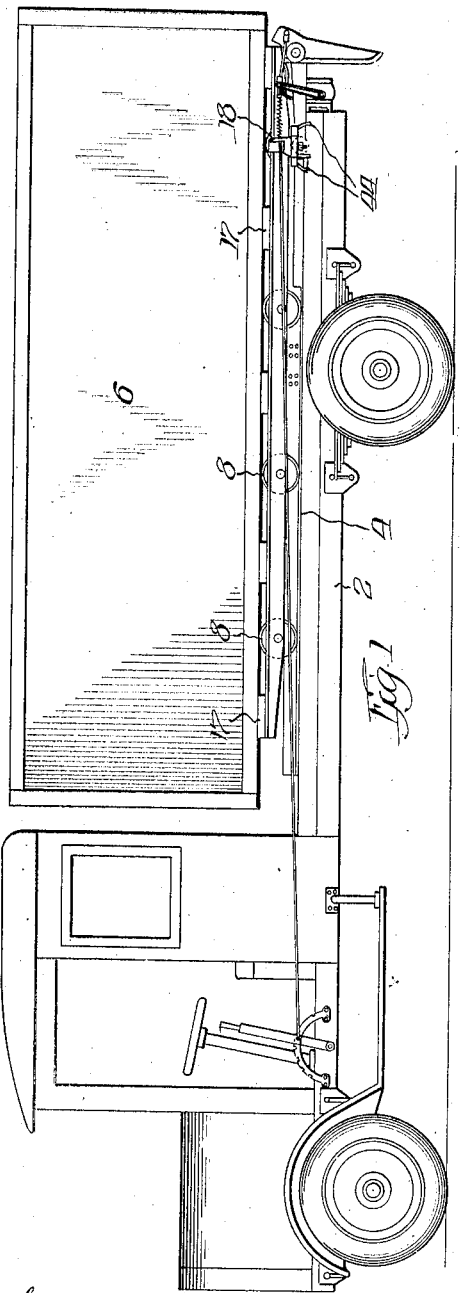
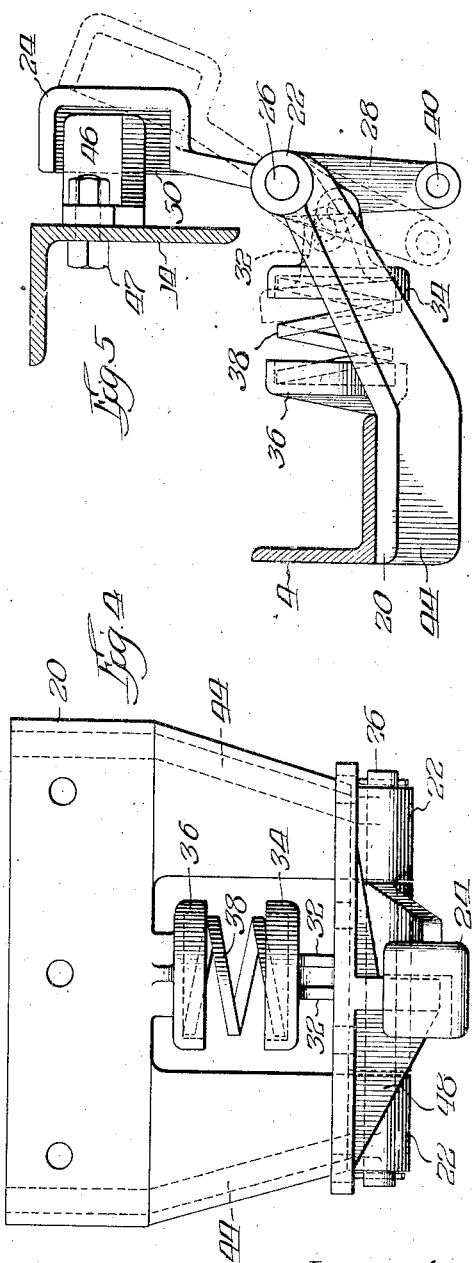
Inventor
William M. Baxter
By Ira J. Wilson, Atty.

Jan. 25, 1927.
W. M. BAXTER
1,615,532
REMOVABLE TRUCK BODY LOCKING MECHANISM
Filed Sept. 5, 1924    2 Sheets-Sheet 2
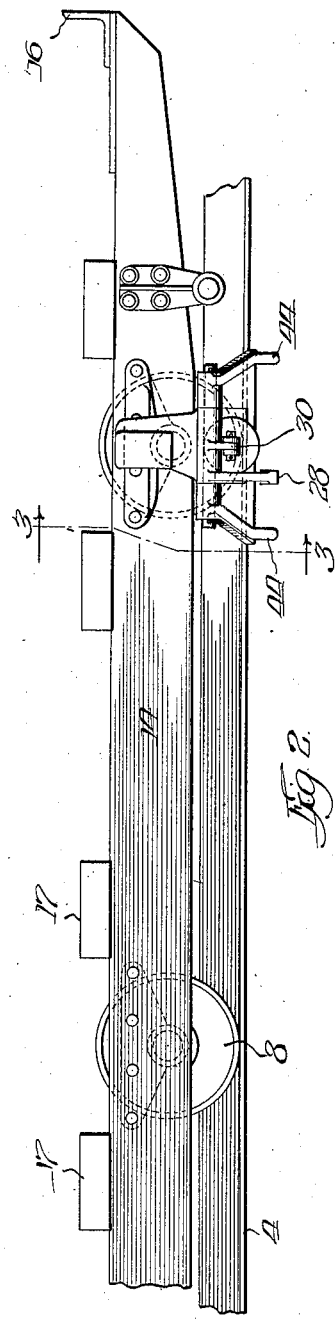
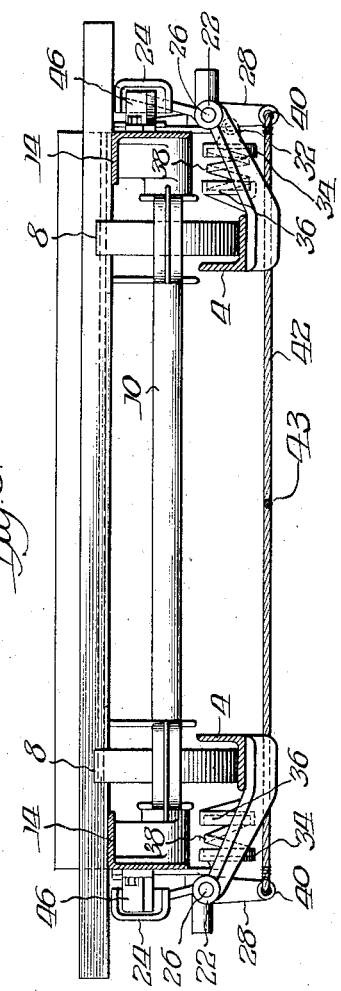
Inventor
William M. Baxter
By Ira J. Wilson Patented Jan. 25, 1927.

1,615,532

UNITED STATES PATENT OFFICE.

WILLIAM M. BAXTER, OF CHICAGO, ILLINOIS, ASSIGNOR TO IDEAL REMOVABLE BODY COMPANY, OF CHICAGO, ILLINOIS, A CORPORATION OF ILLINOIS.

REMOVABLE TRUCK-BODY-LOCKING MECHANISM.

Application filed September 5, 1924. Serial No. 735,988.

The invention pertains to removable vehicle bodies and more particularly to a mechanism arranged to interlockingly engage the vehicle body and vehicle chassis to prevent accidental displacement of the body from the chassis.

In Patent #1,293,664 issued February 11, 1919, an auto truck having a removable body has been shown and described to which the present invention may be applied. Such removable bodies greatly facilitate transportation since the truck may unload a body filled with cargo at its destination and receive an empty body for a return trip. The truck chassis, for this purpose, is provided with tracks or skid-ways and the body with wheels or skids, upon which the body is moved on or off the truck. The track, if the truck be so equipped, is usually flanged along its outer longitudnal edge to retain the body as well as to guide it in its movements on and off the chassis and, in some instances, hooks have been provided upon the chassis to hold the body (empty bodies particularly) down when the truck passes over irregularities in the street and for other purposes. Hooks of this character are shown in my copending application, Serial Number 581,565, filed August 14, 1922, and assigned to Ideal Removable Body Company, Chicago, Illinois.

However due to wear and tear on the aforesaid hooks and on other parts of both chassis and body, or to the relative inertia of a loaded body when the truck is starting or stopping, the hooks may not suffice to prevent the body from becoming disengaged from the chassis. Accordingly, it is most desirable and ofttimes necessary that the body be positively locked into engagement with the chassis to prevent its accidental displacement when the truck is being moved about.

It is therefore a principal object of my invention to provide a locking device to prevent accidental relative displacement of the body and chassis, which will automatically engage and hold the body on the chassis when it has been placed thereon and which may be readily disengaged for removal of the body.

Another object is to provide an arrangement whereby control of the release of locking means may be governed from the truck driver's seat or from the front, side, or rear, or otherwise, as desired.

Further objects reside in features hereinafter appearing from the description and claims and from the drawing in which:

Fig. 1 is a side elevation of a truck of a removable body type showing one manner of applying a form of my invention.

Fig. 2 is a side elevation of rear portions of Figure 1, showing the track on the truck chassis and the chassis of the body on an enlarged scale.

Fig. 3 is a view in sectional elevation taken on the line 3—3 of Figure 2.

Fig. 4 is a top plan view of one type of locking means embraced by the invention, and, Fig. 5 is an end elevation of the arrangement of Figure 4.

As will be seen in Figure 1, the automobile truck chassis 2 may be of any suitable type and preferably carries a track 4, although skid or roller means may be substituted, to receive and guide a removable body 6, having wheels or other means 8 for engagement with the track, during movement of the body from the truck chassis onto a platform or other receiving arrangement and vice versa. The wheels 8 are mounted upon an axle 10, and together support the truck body chassis generally designated at 12 through the medium of longitudinal frame members 14, carrying bearings for the axles and suitably secured in spaced relation by members 16 and 17. One portion of locking device generally designated 18 is carried by the longitudinal frame members 14, and another portion is carried by the track member 4 in a preferred form.

As will be noted from Figure 3, the truck may be equipped with two locking devices, one on either side, and these locking devices preferably are so constructed that when the body is moved onto the truck chassis, the interlocking parts will engage automatically to lock the body thereon, but may be released when desired. The locking mechanism comprises a member 20 secured by bolts or other means to the track 4 and extends upwardly and outwardly to provide spaced hinge eyes 22 between which is hinged the latch proper, designated 24, on a pin 26 passing through eyes 22 and suitably cottered. Forming a part of the latch 24 or rigidly secured thereto, is an arm 28, and a second arm 30, hinged between projecting lugs 32 of a cap 34 cooperative with a similar cap 36 in resilient relation, through the medium of a spring 38. The arm 28 is provided with an opening 40 or other means for engagement with a rope, or cable 42 which may be arranged in conjunction with the opposite latch for simultaneous operation as will hereinafter more clearly appear. Ribs 44 may be formed in the member 20 to serve as a strengthening means, and a latch member 24 is preferably constructed in the form shown, although it may be of any suitable configuration for cooperative engagement with the bolt or keeper 46. The bolt 46 is secured to the body frame by means of bolts or other securing means 47 and has a right angular shoulder formed on its face, as viewed from the rear of the truck, and a bevelled shoulder 48 adapted to engage with the rear face 50 of the latch 24 to force it outwardly to the dotted line position of Figure 5, against the action of the spring 38, until the right angled shoulder enters behind and is engaged by the interior face of said portion 50 when the body is being moved onto the chassis. Under action of the spring, the latch member 24 snaps behind and into engagement with the right angled shoulder of the bolt or keeper member.

It will thus be apparent that when the truck body is rolled onto the truck chassis, the bolts will positively and automatically interlockingly engage with the latch members to securely position the body on the truck against vertical or rearward movements, and that any suitable means may be arranged to engage the rope or chain connecting the arms 28, whereby a pull forwardly or rearwardly will release the latch members from the bolts to permit removal of the body from the truck. In the form of the invention illustrated, the rope or cable 42 is connected intermediate its ends, to a rope or cable 43 passed forwardly or rearwardly of the truck frame to any place where it may be readily grasped by the hand of the operator or connected with any suitable mechanism for operation as will be obvious to those skilled in the art.

While I have shown and described a preferred embodiment of the invention, it will be apparent that the essence of the invention is susceptible of many applications and to many constructions. I do not wish, therefore, to be limited to the details of construction shown and described in disclosing the invention but only by the spirit of the invention and the scope of the appended claims.

I claim:

1. In combination, a vehicle chassis member, a vehicle body member adapted to be moved on and off said chassis member longitudinally thereof, and means for locking said body member to said chassis member when the former is positioned on the latter comprising a rigid element secured to one of said members and provided with two shoulders facing at right angles to one another, and a single element pivotally mounted on the other said member and adapted to engage both of said shoulders, said shoulders of the one element being arranged to cooperate with the pivoted element to releasibly secure said body member against vertical and longitudinal displacement, from said chassis member.

2. In combination, a vehicle chassis member, a body member adapted to be moved in and off said chassis member longitudinally thereof, and means for locking said body member to said chassis member against relative vertical and longitudinal displacement from a predetermined position comprising a single rigid locking element providing a bolt having integral adjacent shoulders facing substantially at right angles to one another and secured to one of said members, and a single locking element providing a releasable latch having integral adjacent shoulders facing substantially at right angles to one another connected with the other said member for releasable engagement with the first locking element, the adjacent shoulders of one of said elements being substantially parallel to the adjacent shoulders of the second of said elements when in locking position so as to engage one another when the body member is mounted on the chassis member to said predetermined position.

3. In combination, a vehicle chassis member, a body member adapted to be moved on and off said chassis member longitudinally thereof, and means for locking said body member to said chassis member against relative vertical and longitudinal displacement from a predetermined position comprising a pair of cooperative locking elements, one of said elements being secured to said chassis member and having a forwardly facing shoulder, and an adjacent shoulder substantially at right angles thereto and lying in a substantially horizontal plane; the other of said elements being connected to the body member having a rearwardly facing shoulder cooperative with the forwardly facing shoulder of the first element to secure the chassis and body members against relative longitudinal displacement in one direction and a shoulder facing in a substantially horizontal plane substantially at right angles to the rearwardly facing shoulder and cooperatively engageable with the shoulder of the first element lying in a horizontal plane for securing the body and chassis members against relative vertical displacement in one direction.

4. In combination, a vehicle chassis, a body adapted to be moved on and off said chassis longitudinally thereof and means for locking said body on said chassis when positioned thereon comprising, a rigid member secured on the side of said body and provided with a rearwardly facing shoulder and a forwardly declining surface from the top of said shoulder, a member pivoted on said chassis having a forwardly facing shoulder cooperative with the first said shoulder and with said surface upon movement of said body onto said chassis, and means normally resiliently urging said pivoted member toward said surface whereby upon movement of said body into position upon said chassis, said surface will force said pivoted member outwardly about its pivot until said shoulders engage one another.

5. In combination, a vehicle chassis, a body adapted to be moved on and off said chassis longitudinally thereof, and means for locking said body on said chassis when positioned thereon comprising, a rigid member secured on the side of said body and provided with a rearwardly facing shoulder and forwardly declining surface from the top of said shoulder, a member pivoted on said chassis having a forwardly facing shoulder cooperative with and behind the first said shoulder and with said surface upon movement of said body onto said chassis, means normally resiliently urging said pivoted member toward said surface whereby upon movement of said body into position upon said chassis, said surface will force said pivoted member outwardly about its pivot until said shoulders engage one another, and means for releasing said shoulders from interengagement.

WILLIAM M. BAXTER.